(12) United States Patent
Bamford et al.

(10) Patent No.: US 8,935,632 B2
(45) Date of Patent: Jan. 13, 2015

(54) METHOD AND APPARATUS FOR OPERATING USER INTERFACE AND RECORDING MEDIUM USING THE SAME

(75) Inventors: Drew Bamford, Taoyuan County (TW); Micah Shotel, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 810 days.

(21) Appl. No.: 12/325,252

(22) Filed: Nov. 30, 2008

(65) Prior Publication Data

US 2009/0265628 A1 Oct. 22, 2009

(30) Foreign Application Priority Data

Apr. 22, 2008 (TW) .............................. 97114688 A

(51) Int. Cl.
 G06F 3/048 (2013.01)
 G06F 3/0488 (2013.01)
 H04N 5/445 (2011.01)
 G06F 3/0482 (2013.01)

(52) U.S. Cl.
 CPC .......... G06F 3/0488 (2013.01); H04N 5/44543 (2013.01); G06F 3/0482 (2013.01)
 USPC ....................................................... 715/810

(58) Field of Classification Search
 CPC .. G06F 3/0481; G06F 3/0482; H04N 5/44543
 USPC ......... 715/702, 788, 810, 822, 864, 866, 769, 715/778
 See application file for complete search history.

(56) References Cited

U.S. PATENT DOCUMENTS

| | | | |
|---|---|---|---|
| 5,848,429 A * | 12/1998 | McEntee et al. | 715/255 |
| 6,073,036 A * | 6/2000 | Heikkinen et al. | 455/550.1 |
| 6,690,391 B1* | 2/2004 | Proehl et al. | 715/720 |
| 7,152,210 B1* | 12/2006 | Van Den Hoven et al. | 715/723 |
| 7,574,672 B2* | 8/2009 | Jobs et al. | 715/830 |
| 8,015,506 B2* | 9/2011 | Fleishman et al. | 715/810 |
| 2002/0191029 A1* | 12/2002 | Gillespie et al. | 345/810 |
| 2003/0001907 A1* | 1/2003 | Bergsten et al. | 345/853 |

(Continued)

FOREIGN PATENT DOCUMENTS

| | | |
|---|---|---|
| JP | 2000-187554 | 7/2000 |
| JP | 2002-111839 | 4/2002 |

(Continued)

OTHER PUBLICATIONS

"Search Report of European counterpart application", issued on Aug. 24, 2009, p. 1-p. 5.

(Continued)

*Primary Examiner* — Anil Bhargava
(74) *Attorney, Agent, or Firm* — Jianq Chyun IP Office

(57) ABSTRACT

A method and an apparatus for operating a user interface, and a recording medium using the same are provided. First, a plurality of user interfaces is provided and one of them is displayed on a touch screen of a portable electronic device. Then, the touch screen is used for detecting a touch signal. When the touch signal is moved toward a first direction, the currently displayed user interface is switched to another one. When the touch signal is moved toward a second direction, an item of the currently displayed user interface is switched to another item. Accordingly, a more intuitive and convenient manner for operating the user interface is provided for the user.

14 Claims, 8 Drawing Sheets

(56) References Cited

U.S. PATENT DOCUMENTS

| | | | | |
|---|---|---|---|---|
| 2004/0233238 | A1* | 11/2004 | Lahdesmaki | 345/810 |
| 2005/0125570 | A1* | 6/2005 | Olodort et al. | 710/15 |
| 2005/0257166 | A1* | 11/2005 | Tu | 715/787 |
| 2006/0041847 | A1* | 2/2006 | Maw | 715/793 |
| 2007/0101364 | A1* | 5/2007 | Morita | 725/38 |
| 2008/0174570 | A1* | 7/2008 | Jobs et al. | 345/173 |
| 2008/0189657 | A1* | 8/2008 | Kim | 715/810 |
| 2009/0024954 | A1* | 1/2009 | Sakamoto et al. | 715/781 |
| 2009/0153288 | A1* | 6/2009 | Hope et al. | 340/3.1 |
| 2009/0195959 | A1* | 8/2009 | Ladouceur et al. | 361/283.1 |

FOREIGN PATENT DOCUMENTS

| | | |
|---|---|---|
| JP | 2003264621 | 9/2003 |
| JP | 2006106934 | 4/2006 |
| JP | 2006113765 | 4/2006 |
| JP | 2007128364 | 5/2007 |
| JP | 2007179168 | 7/2007 |
| JP | 2008-35555 | 2/2008 |
| KR | 100617821 | 8/2006 |
| KR | 1020060118270 | 11/2006 |
| WO | 2007089766 | 8/2007 |
| WO | WO 2007089766 A2 * | 8/2007 |
| WO | 2008033853 | 3/2008 |
| WO | 2008086306 | 7/2008 |
| WO | WO 2008086306 A1 * | 7/2008 |
| WO | 2009089222 | 7/2009 |
| WO | WO 2009089222 A2 * | 7/2009 |

OTHER PUBLICATIONS

"1st Office Action of Korea Counterpart Application" with English translation thereof, issued on Sep. 18, 2010, p. 1-p. 8, in which the listed references were cited.

"Office Action of Japan Counterpart Application", issued on Mar. 1, 2011, p. 1-p. 2, in which the listed references were cited.

* cited by examiner

METHOD AND APPARATUS FOR OPERATING USER INTERFACE AND RECORDING MEDIUM USING THE SAME

CROSS-REFERENCE TO RELATED APPLICATION

This application claims the priority benefit of Taiwan application serial no. 97114688, filed on Apr. 22, 2008. The entirety of the above-mentioned patent application is hereby incorporated by reference herein and made a part of specification.

BACKGROUND OF THE APPLICATION

1. Field of the Application

The present application relates to a method and an apparatus for switching a user interface, in particular, to a method and an apparatus for respectively switching the user interface and the items using a representational icon bar and an item icon bar.

2. Description of Related Art

In order to cater for the busy life of modern people, various portable electronic devices that occupy smaller space and are convenient to carry along are put forward one after another. For example, Personal Digital Assistant (PDA) phones not only provide with all functions of a conventional communication device but also enable the user to edit files, receive/send emails, access networks, or use instant communication software through a built-in windows operating system. That is to say, such portable electronic devices may be used for not only making phone calls but also providing diversified functions just like mini personal computers. For modern people seeking for efficiency all the time, such devices have been one of the tools that are indispensable in the life.

However, for portable electronic devices requiring for "light, thin, short, and small," the volume is considerably limited. If both a screen and a keypad are needed to be disposed on the device, the size of the screen must be reduced. Meanwhile, in order to equip a relatively large screen in a limited space, recently, a touch screen has been developed. The touch screen integrates the keypad as the input interface of the portable electronic device, thus saving the cost and area occupied by the conventional keypad.

As compared with the conventional keypad input manner, the operating manner of a touch screen is simple and intuitive. From the comparison with the conventional keypad, it can be easily found that when operating an electronic device with a keypad, the user must read the content displayed on the screen while pressing the keypad, so as to successfully finish operations such as word inputting or menu switching. However, if a touch screen is applied in the electronic device, the user can easily finish various operations by simply clicking with a stylus or directly pressing with his finger on the screen. Therefore, the touch screen is actually a more convenient input manner.

However, the touch screen of the portable electronic device is still limited in size, whereas the portable electronic device has fairly diversified functions. In order to display items of a number of functions on a limited screen for the user to choose, the cell phones currently available on the market mostly adopt a graphical user interface which uses thumbnail icons arranged in the touch screen to represent all the functions.

FIG. 1 shows a schematic view of a conventional graphical user interface. Referring to FIG. 1, in a graphical user interface 100, the touch screen is divided into multiple display blocks respectively displaying representational icons including a Home 110, a contact function 120, a message function 130, an email function 140, a camera function 150, a music function 160, a network function 170, a weather function 180, a setting function 190, or the like. Although the above manner enables the user to clearly see all the functions of the portable electronic device, once the user chooses to enter an operation interface corresponding to a representational icon, only one function can be performed, and if the user wants to switch to another function, he/she must return to the original graphical user interface 100 to choose another representational icons, which is quite inconvenient in use.

SUMMARY OF THE APPLICATION

Accordingly, the present application provides a method for operating a user interface, which achieves the switch between the user interfaces or the items in the user interface according to the direction of the touch-and-drag motion by the user.

The present application provides an apparatus for operating a user interface, which displays a representational icon bar and an item icon bar through different modules to provide convenience and flexibility for the user to operate the user interface.

As broadly described and embodied herein, the present application provides a method for operating a user interface adapted to a portable electronic device with a touch screen, which comprises the following steps. First, a plurality of user interfaces is provided and one of the user interfaces is displayed on the touch screen. Then, the touch screen detects a touch signal. When the touch signal is moved toward a first direction, the currently displayed user interface is switched to another user interface, and when the touch signal is moved toward a second direction, an item in the currently displayed user interface is switched to another item. The first direction and the second direction are substantially perpendicular to each other. In an embodiment of the present application, the above first direction is left or right and the second direction is up or down.

In an embodiment of the present application, the above operating method further comprises displaying a representational icon bar on a first margin of the user interface and displaying an item icon bar on a second margin of the user interface. The representational icon bar comprises representational icons respectively corresponding to each of the user interfaces and the item icon bar comprises item icons respectively corresponding to a plurality of items in the currently displayed user interface.

In an embodiment of the present application, the above operating method further comprises moving the representational icon bar toward the first direction or a direction opposite to the first direction when the touch signal is moved toward the first direction, and moving the item icon bar toward the second direction or a direction opposite to the second direction when the touch signal is moved toward the second direction.

In an embodiment of the present application, the above representational icon bar is displayed in the first direction and the item icon bar is displayed in the second direction.

In an embodiment of the present application, the step of displaying the representational icon bar on the first margin of the user interface comprises displaying a magnified representational icon corresponding to the currently displayed user interface in the representational icon bar. The step of displaying the item icon bar on the second margin of the user interface comprises displaying a magnified item icon corresponding to the currently displayed item in the currently displayed user interface in the item icon bar.

In an embodiment of the present application, the step of detecting the touch signal by the touch screen further comprises determining whether a displacement of the touch signal exceeds a preset value, and switching the user interface or the item when the displacement exceeds the preset value. The displacement comprises a horizontal displacement or a vertical displacement.

In an embodiment of the present application, the representational icon bar is displayed on an upper part or a lower part of the user interface and the item icon bar is displayed on a left part or a right part of the user interface.

In an embodiment of the present application, the above portable electronic device comprises a PDA or a PDA phone.

The present application provides an apparatus for operating a user interface, which comprises a touch screen, a user interface display module, and a switch module. The touch screen is used to detect a touch signal. The user interface display module is used to display one of the user interfaces on the touch screen. The switch module is used to selectively switch the user interface or the item according to the touch signal detected by the touch screen. The currently displayed user interface is switched to another user interface when the touch signal is moved toward a first direction, and the item in the currently displayed user interface is switched when the touch signal is moved toward a second direction. The first direction and the second direction are substantially perpendicular to each other. In an embodiment of the present application, the first direction is left or right and the second direction is up or down.

In an embodiment of the present application, the above operating apparatus further comprises a representational icon bar display module and an item icon bar display module. The representational icon bar display module is used to display the representational icon bar on a first margin of the user interface, wherein the representational icon bar comprises a representational icon corresponding to each of the user interfaces. The item icon bar display module is used to display the item icon bar on a second margin of the user interface, wherein the item icon bar comprises item icons respectively corresponding to a plurality of items in the currently displayed user interface.

In an embodiment of the present application, when the touch signal is moved toward the first direction, the switch module further moves the representational icon bar toward the first direction or a direction opposite to the first direction. When the touch signal is moved toward the second direction, the switch module further moves the item icon bar toward the second direction or a direction opposite to the second direction.

In an embodiment of the present application, the above representational icon bar is displayed in the first direction and the item icon bar is displayed in the second direction.

In an embodiment of the present application, the above representational icon bar display module further comprises displaying a magnified representational icon corresponding to the currently displayed user interface in the representational icon bar, and the item icon bar display module further comprises displaying a magnified item icon corresponding to the currently displayed item in the currently displayed user interface in the item icon bar.

In an embodiment of the present application, the above switch module further determines whether the displacement of the touch signal exceeds a preset value, and switches the user interface or the item when the displacement exceeds the preset value. The displacement comprises a horizontal displacement or a vertical displacement.

The present application provides a recording medium for recording a computer program including a plurality of program codes adapted to be loaded into a portable electronic device to enable the above portable electronic device to perform a method for operating a user interface. The method comprises the following steps. First, a plurality of user interfaces is provided and one of the user interfaces is displayed on the touch screen. Then, the touch screen detects a touch signal. When the touch signal is moved toward a first direction, the currently displayed user interface is switched to another user interface, and when the touch signal is moved toward a second direction, an item in the currently displayed user interface is switched to another item. The first direction and the second direction are substantially perpendicular to each other.

The present application achieves the switch between a plurality of user interfaces or a plurality of items in a single user interface through dragging actions in different directions. In this way, the user may swiftly switch the user interface and the item in the user interface by dragging in horizontal or vertical direction on the touch screen.

To make the above and other objectives, features, and advantages of the present application more apparent, a detail description with respect to the embodiments are made below in conjunction with the accompanying drawings.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DESCRIPTION OF THE EMBODIMENTS

A portable electronic device has plenty of functions, each function has a corresponding user interface, and a user interface may further contain a plurality of items. Therefore, in order to enable a user to freely switch between the user interfaces and the items, the present application achieves the switch between the user interfaces or the items in the user interface in the portable electronic device by dragging in horizontal and vertical directions, thereby improving the convenience and flexibility in operating the user interface. The present application is a method and an apparatus for operating a user interface and a recording medium using the same based on the above concept. To make the content of the present application more apparent, the following embodiments are illustrated as examples for implementation of the present application.

Figure 1:
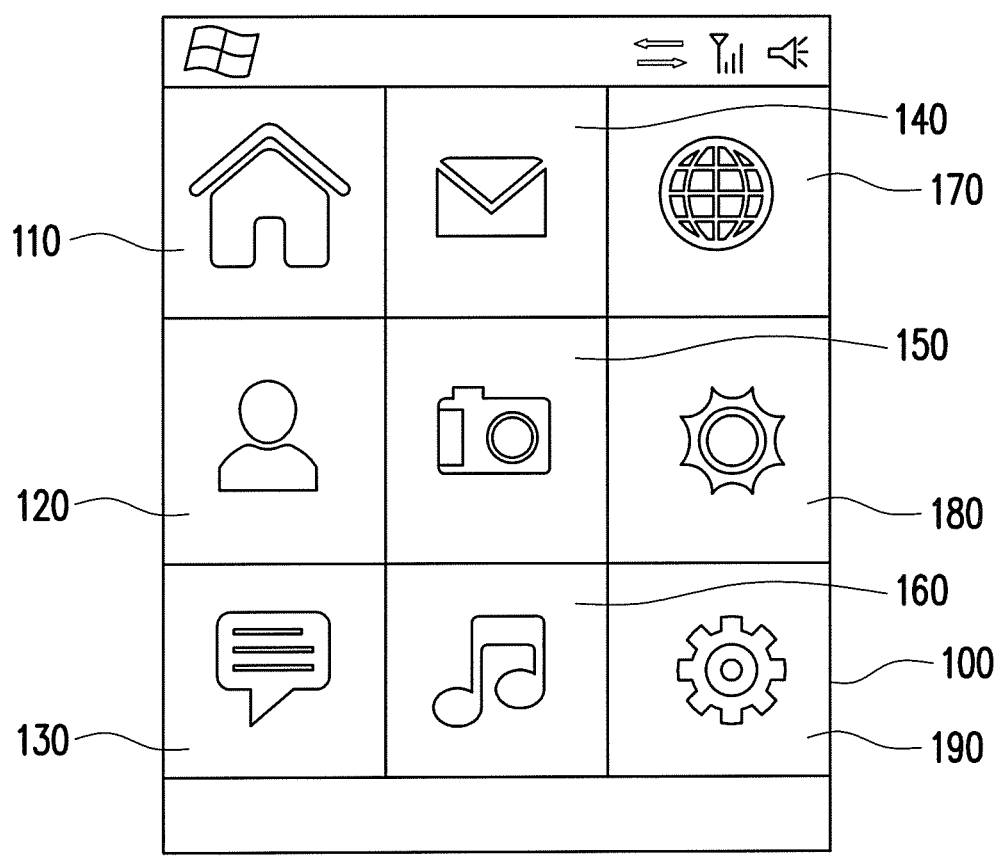
FIG. 1 shows a schematic view of a conventional graphical user interface.
Figure 2:
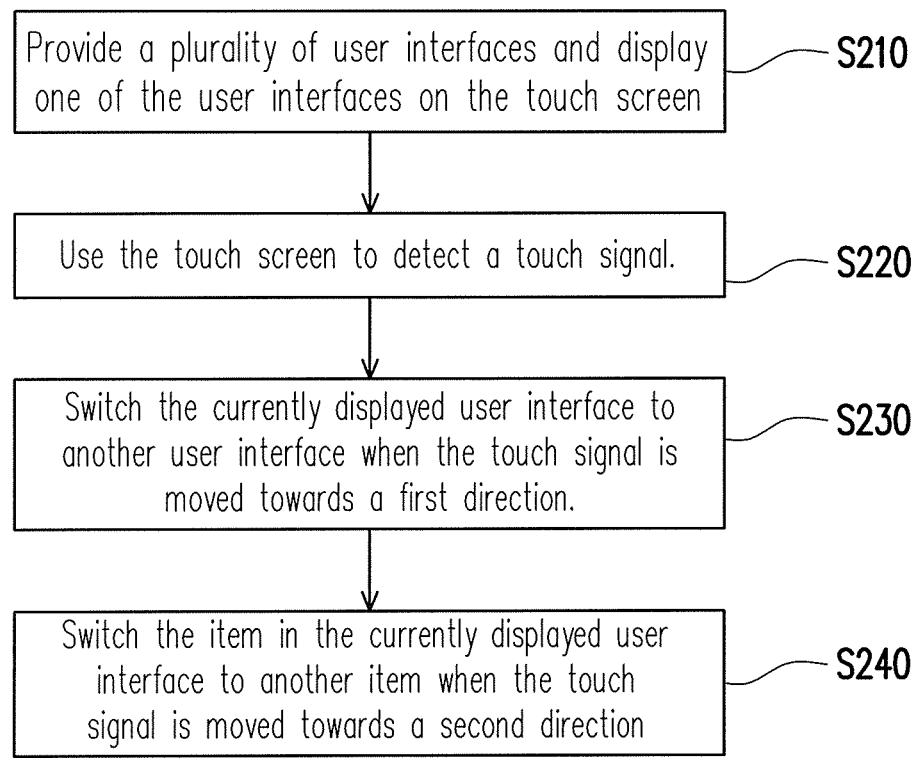
FIG. 2 shows a flowchart of a method for operating a user interface according to an embodiment of the present application.

FIG. 2 shows a flowchart of a method for operating a user interface according to an embodiment of the present application. Referring to FIG. 2, this embodiment is adapted to a portable electronic device with a touch screen, and the portable electronic device may be, but not limited to, a PDA or a PDA phone.

First, the portable electronic device provides a plurality of user interfaces, and displays one of the user interfaces on the touch screen (Step S210). The user interfaces respectively correspond to a function of the portable electronic device, and the user interface displayed on the touch screen is, for example, but not limited to, the preset user interface of the portable electronic device or the user interface that is recently used by the user in this embodiment.

Then, the portable electronic device detects the touch signal from the user with the touch screen (Step S220). When the touch screen detects the touch signal that is moved toward a first direction, the portable electronic device switches the currently displayed user interface to another user interface (Step S230). On the other hand, when the touch screen detects the touch signal that is moved toward a second direction, the portable electronic device switches the items in the currently displayed user interface (Step S240). The above first direction and second direction are substantially perpendicular to each other. Preferably, the first direction is a horizontal direction and the second direction is a vertical direction. More preferably, the first direction is left or right and the second direction is up or down.

It should be noted that this embodiment further comprises determining whether to switch the user interface or the item according to the displacement of the touch signal. More particularly, if the user touches the screen by way of dragging, the touch screen will detect a continual touch signal. That is to say, the touch signal has a displacement. At this time, the portable electronic device further determines whether the displacement of the touch signal exceeds a preset value and switches the user interface when the displacement exceeds the preset value. The above displacement is, for example, a horizontal displacement or a vertical displacement.

Figure 3:
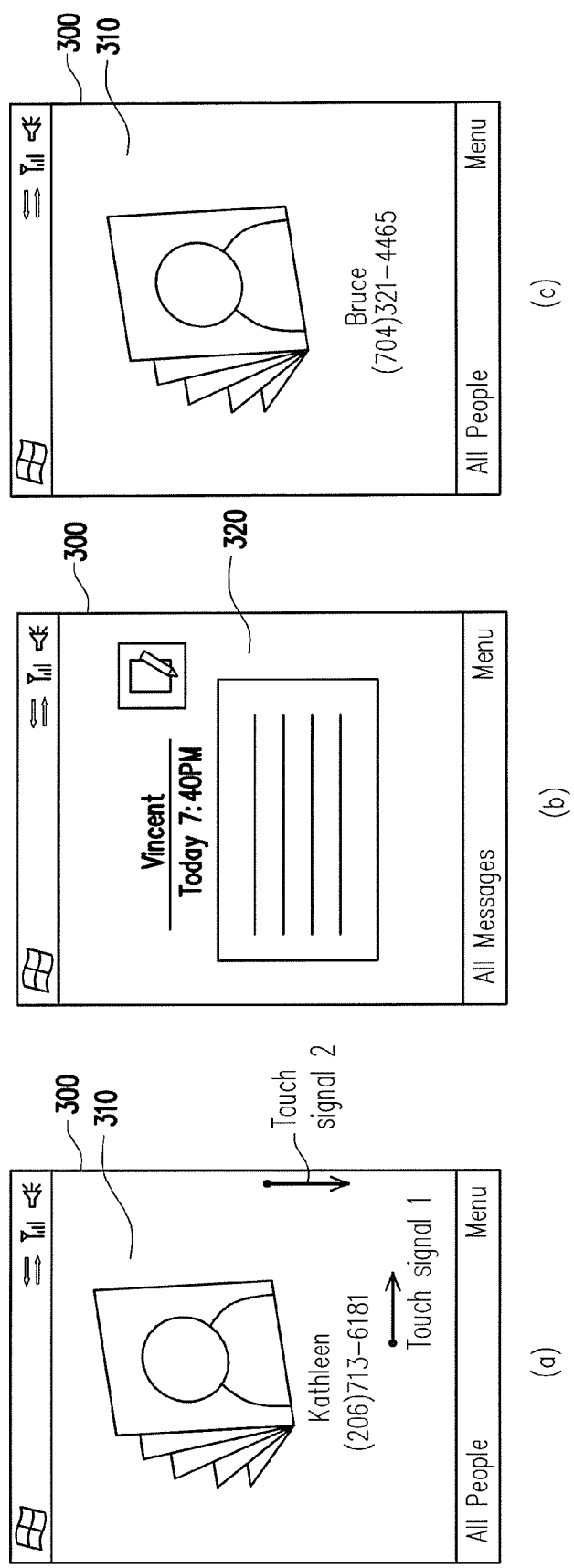
FIGS. 3(a), 3(b), and 3(c) show schematic views of a method for operating a user interface according to an embodiment of the present application.

For example, FIGS. 3(a), 3(b), and 3(c) show schematic views of a method for operating a user interface according to an embodiment of the present application. Referring to FIG. 3(a) first, in this embodiment, a user interface 310 corresponding to the contact function is displayed in advance on a touch screen 300 of the portable electronic device and the contact information of a preset contact (i.e. Kathleen) is displayed in the user interface 310.

At this time, if the user touches the user interface 310 and slides to the right exceeding a preset value, the touch screen 300 will detect a touch signal 1, and the portable electronic device then switch the user interface 310 to the user interface 320 of a next function (e.g., message function) (as shown in FIG. 3(b)).

By contrast, if the user touches the user interface 310 and slides downwardly exceeding a preset value, the touch screen 300 will detect a touch signal 2, and the portable electronic device then changes the contact information of the contact displayed on the user interface 310 into the contact information of a next contact (i.e. Bruce) (as shown in FIG. 3(c)).

The operating manner provided by the above embodiment enables the user to freely switch between various functions of the portable electronic device and the items at will while eliminating complex operating actions.

On the other hand, the present application further comprises respectively designing a representational icon bar and an item icon bar according to various user interfaces of the portable electronic device and the items in each user interface, so as to provide another manner for the user to switch the user interfaces and the items, which will be described in detail with another embodiment.

Figure 4:
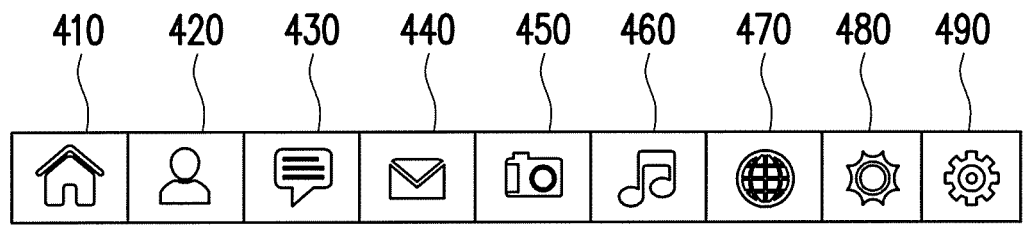
FIG. 4 shows a schematic view of a representational icon bar according to an embodiment of the present application.

FIG. 4 shows a schematic view of a representational icon bar according to an embodiment of the present application. Referring to FIG. 4, in this embodiment, all the functions of the portable electronic device are represented by a representational icon bar 400. The representational icon bar 400 comprises a plurality of representational icons, which are Home 410, contact function 420, message function 430, email function 440, camera function 450, music function 460, network function 470, weather function 480, and setting function 490 sequentially. The number and content of the representational icons in the representational icon bar 400 are illustrated only by way of example without intending to limit the scope of the present application. Those skilled in the art may allocate different types or numbers of representational icons in the representational icon bar 400.

Figure 5:
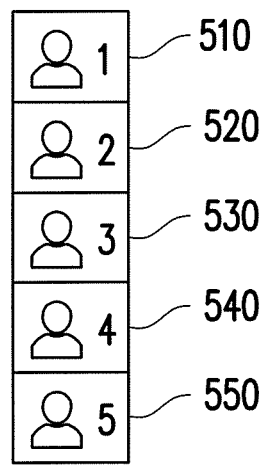
FIG. 5 shows a schematic view of an item icon bar according to an embodiment of the present application.

On the other hand, FIG. 5 shows a schematic view of an item icon bar according to an embodiment of the present application. Referring to FIG. 5, in this embodiment, the contact function of the portable electronic device is illustrated as an example. All the contacts are represented by an item icon bar 500. The item icon bar 500 comprises a plurality of item icons, which are contact 510, contact 520, contact 530, contact 540, and contact 550 sequentially. Likewise, the number of contacts is described only as an example without intending to limit the scope of the present application.

Figure 6:
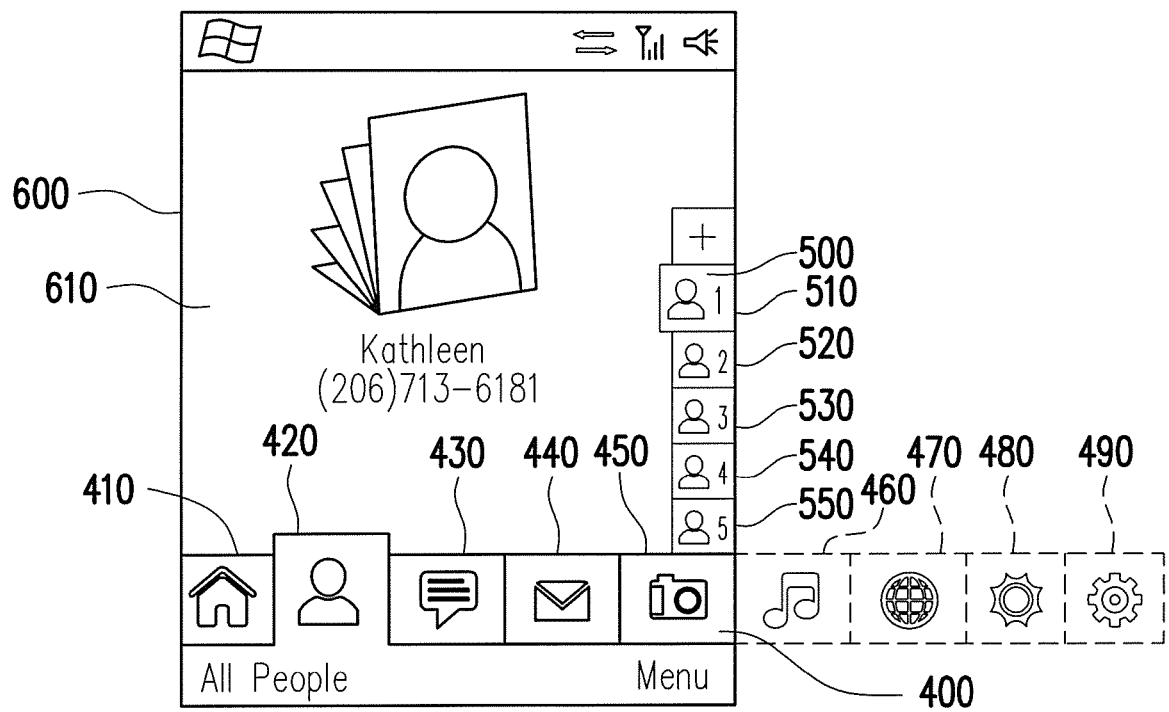
FIG. 6 shows a schematic view of a representational icon bar and an item icon bar displayed on the touch screen according to an embodiment of the present application.

Next, FIG. 6 shows a schematic view of a representational icon bar and an item icon bar displayed on the touch screen according to an embodiment of the present application. Referring to FIGS. 4, 5, and 6, in this embodiment, the preset function of the portable electronic device is assumed to be the contact function and the preset contact in the contact function is assumed to be the contact 510. At this time, the portable electronic device displays the user interface 610 of the contact function on the touch screen 600, displays the representational icon bar 400 on the lower part of the user interface 610 and displays the item icon bar 500 on the right part of the user interface 610. The positions of the representational icon bar 400 and item icon bar 500 are described by way of example without intending to limit the scope of the present application. Those skilled in the art may choose to display the representational icon bar 400 and the item icon bar 500 on other margins of the user interface 610 (upper, lower, left, and right) depending on practical requirements.

Since the touch screen 600 has a limited space, only the first five representational icons in the representational icon bar 400 can be displayed in the touch screen 600, including Home 410, contact function 420, message function 430, email function 440, and camera function 450. Similarly, only five contacts can be displayed in the item icon bar 500. The representational icon for the contact function 420 and the item icon for the contact 510 are displayed, e.g., magnified to remind the user of the currently selected function and contact. Here, if the user clicks other representational icons in the representational icon bar 400, the portable electronic device will switch the user interface 610 to the user interface corresponding to the representational icon. Furthermore, if the user clicks other item icons in the item icon bar, the portable electronic device will display the contact information corresponding to the item icon in the user interface 610.

Based on the designed architecture of the representational icon bar and item icon bar, the present application provides a corresponding operating method to achieve the switch between the functions and the contacts, so as to help the user to swiftly switch the user interface and the items, which is described in detail with another embodiment.

Figure 7:
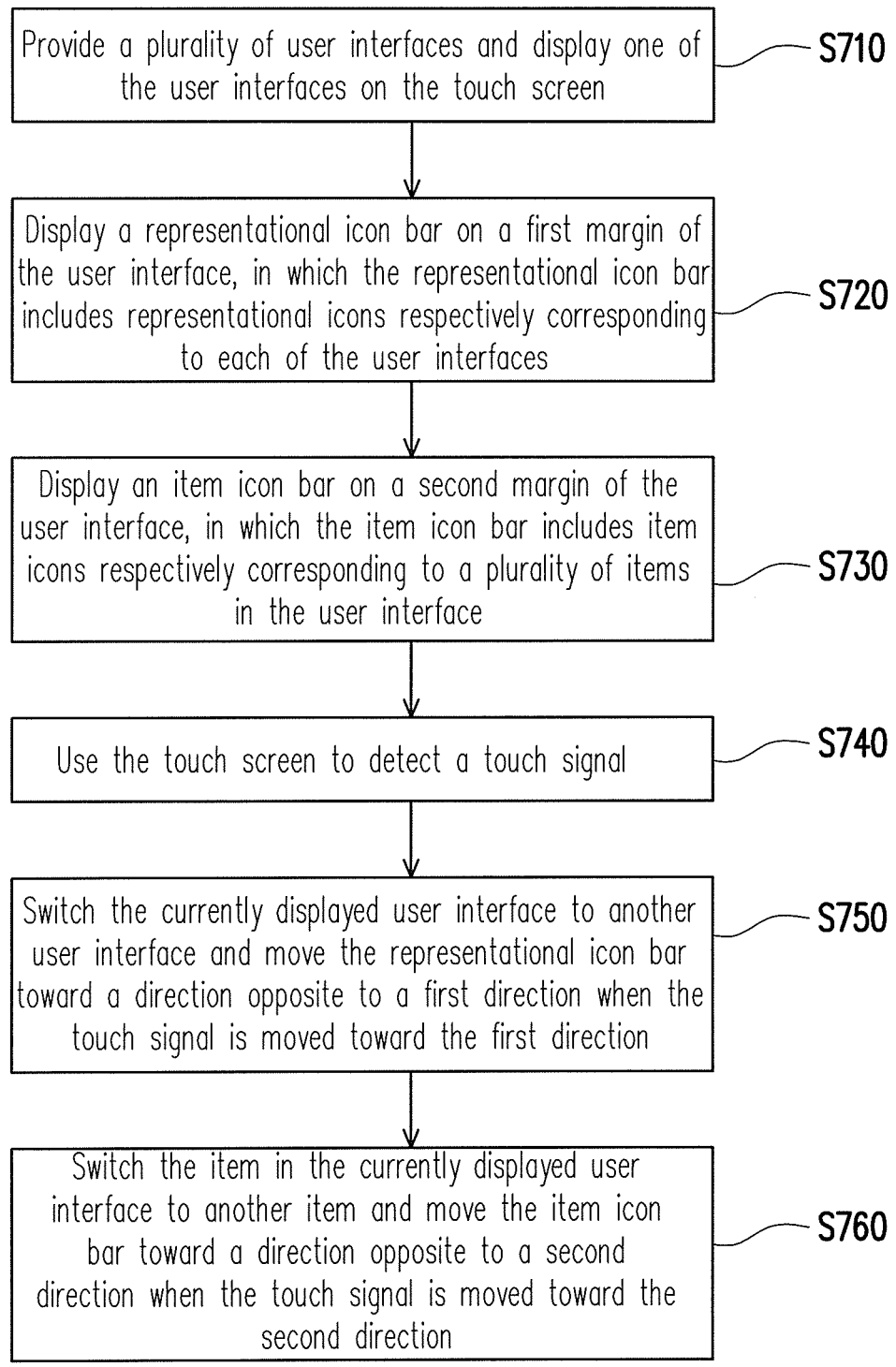
FIG. 7 shows a flowchart of a method for operating a user interface according to an embodiment of the present application.

FIG. 7 shows a flowchart of a method for operating a user interface according to an embodiment of the present application. Referring to FIG. 7, this embodiment is adapted to a portable electronic device with a touch screen, and the portable electronic device may be, for example, but not limited to, a PDA or a PDA phone.

First, the portable electronic device provides a plurality of user interfaces, and displays one of the user interfaces on the touch screen (Step S710). The user interfaces respectively correspond to a function of the portable electronic device, and the user interface displayed on the touch screen is, for example, but not limited to, the preset user interface of the portable electronic device or the user interface that is recently used by the user in this embodiment.

Then, the portable electronic device displays a representational icon bar on a first margin of the user interface (Step S720) and the representational icon bar comprises representational icons respectively corresponding to each of the user interfaces. Meanwhile, the portable electronic device may display an item icon bar on a second margin of the user interface (Step S730) and the item icon bar comprises item icons respectively corresponding to a plurality of items in the user interface.

In detail, the number of the representational icons contained in the representational icon bar is determined, e.g., depending on the number of the built-in functions of the portable electronic device. The patterns of the representational icons are selected from the patterns related to the functions, so as to help the user to swiftly browse all the functions in the portable electronic device. For example, a pattern of house represents Home, a pattern of character represents the contact function, and a pattern of letter represents the email function, and so on.

Similarly, the number of the item icons contained in the item icon bar is determined depending on the number of items contained in the built-in functions of the portable electronic device. The patterns of the item icons are selected from the patterns related to the items, so as to help the user to swiftly browse all the items. For example, a downsized picture of a contact may be used to represent the contact.

After that, the portable electronic device may use the touch screen to detect the touch signal from the user (Step S740). When the touch screen detects the touch signal that is moved toward a first direction, the portable electronic device switches the currently displayed user interface to another user interface (Step S750).

In detail, if the user only clicks the representational icon, the touch screen only detects a single point of the touch signal. At this time, in addition to switching the user interface according to the representational icon that the touch signal resides, the representational icon is magnified to remind the user of the representational icon currently clicked.

However, if the user touches the screen by way of dragging, the touch screen will detect a continual touch signal. That is to say, the touch signal has a displacement. At this time, the portable electronic device may further determine whether the displacement of the touch signal exceeds a preset value, and switches the user interface when the displacement exceeds the preset value. The above displacement is, e.g., a horizontal displacement or a vertical displacement.

For example, if the representational icon bar is horizontally displayed on the touch screen, when the user wants to switch the representational icon, he/she may intuitively operate by dragging in horizontal direction. Then, the portable electronic device may determine whether to switch the user interface depending on the value of the horizontal displacement. In addition, when the portable electronic device switches the user interface, the representational icon bar is also moved toward a direction same as or opposite to the movement of the touch signal. That is to say, the touching or dragging direction of the user is the same as or opposite to the direction of movement of the representational icon bar.

In another case, when the touch signal is moved toward a second direction, the portable electronic device switches the item in the currently displayed user interface (Step S760). Similar to the case of the representational icon bar, if the user only clicks the item icon, the portable electronic device will switch the item based on the item icon on which the touch signal resides and magnify the item icon. If the user touches the screen by way of dragging, the portable electronic device will further determine whether the displacement of the touch signal exceeds a preset value and switch the item in the user interface only when the displacement exceeds the preset value.

The purpose of arranging the representational icon bar and the item icon bar on different margins of the user interface is to differentiate the touching actions of the user. The user may intuitively consider horizontal dragging and vertical dragging as two different operating actions, and thus by associating the two operating actions with the representational icon bar and the item icon bar respectively, the user may operate the user interface more fluently.

Figure 8:
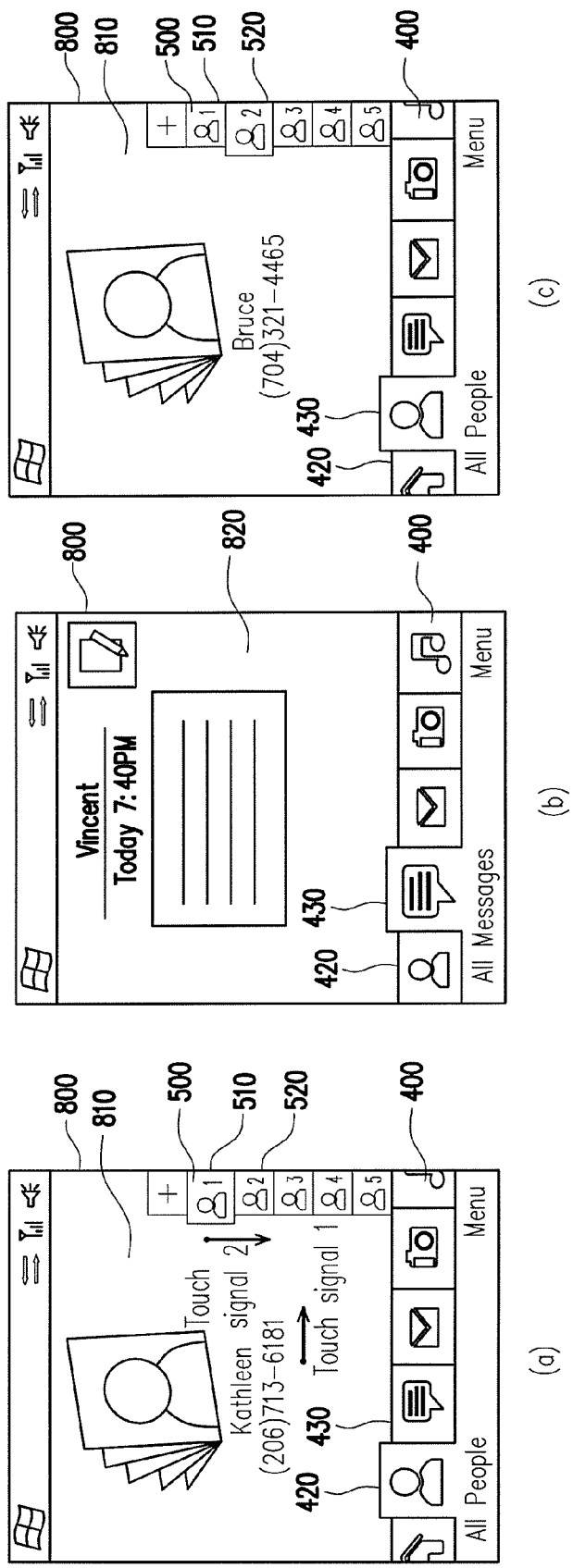
FIGS. 8(a), 8(b), and 8(c) show schematics view of a method for operating a user interface according to an embodiment of the present application.

For example, FIGS. 8(a), 8(b), and 8(c) show schematic views of a method for operating a user interface according to an embodiment of the present application. Referring to FIG. 8(a) first, in this embodiment, the user interface 810, the first five representational icons (nine representational icons in total) in the representational icon bar 400, and the five contacts in the item icon bar 500 are displayed in advance on the touch screen 800 of the portable electronic device, and the contact function 420 is set as the preset function and the contact 510 is set as the preset contact.

Now, if the user touches the user interface 810 and slides to the right with a displacement exceeding a preset value, the touch screen 800 will detect a touch signal 1. At this time, the portable electronic device may switch the user interface 810 originally displayed on the touch screen 800 to the user interface 820 corresponding to the message function 430. At the same time, the portable electronic device relatively moves the representational icon bar 400, thus switching the contact function 420 to the message function 430 (as shown in FIG. 8(b)). Accordingly, the user may use the user interface 820 to read or receive/send messages.

On the other hand, if the user touches the user interface 810 and slides downwardly with a displacement exceeding a preset value, the touch screen 800 will detect a touch signal 2. At this time, the portable electronic device switches the contact information of the contact 510 originally displayed on the user interface 810 to the contact information of the contact 520. At the same time, the portable electronic device also changes the enlarged item icon into the contact 520, thereby switching the contact 510 to the contact 520 (as shown in FIG. 8(c)).

The operating manner provided by the above embodiment enables the user to freely switch between various functions of the portable electronic device and the items at will while eliminating complex operating actions.

Figure 9:
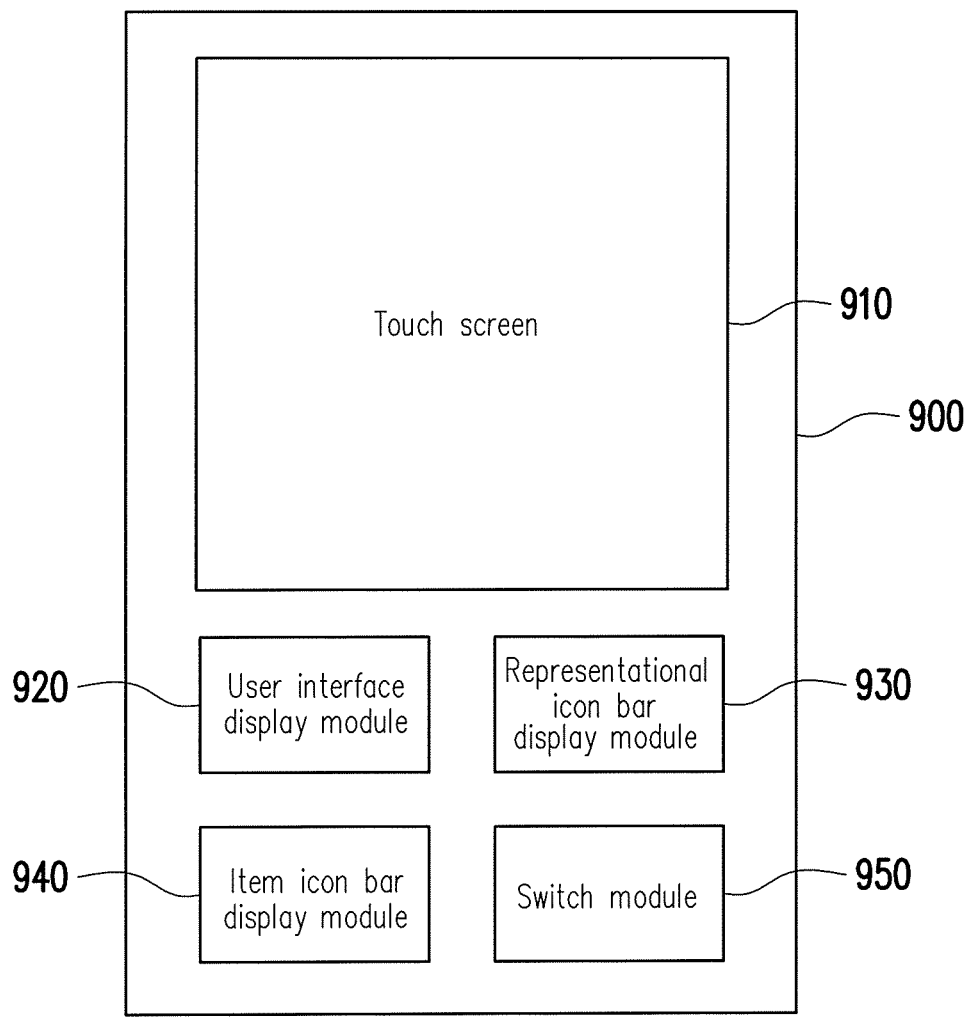
FIG. 9 shows a block diagram of an apparatus for operating a user interface according to an embodiment of the present application.

It should be noted that in another embodiment of the present application, the above operating method is realized in a physical apparatus, which is described in detail with another embodiment. FIG. 9 shows a block diagram of an apparatus for operating a user interface according to an embodiment of the present application. Referring to FIG. 9, the operating apparatus 900 in this embodiment is, e.g., disposed in a portable electronic device such as a PDA or a PDA phone for operating the user interface. The operating apparatus 900 comprises a touch screen 910, a user interface display module 920, a representational icon bar display module 930, an item icon bar display module 940, and a switch module 950, and the functions thereof are described as follows.

The touch screen 910 is used to detect the touching action of the user and generate the corresponding touch signal. The user interface display module 920 is used to display one of the user interfaces on the touch screen 910. The representational icon bar display module 930 is used to display a representational icon bar on the touch screen 910, and the representational icon bar comprises representational icons respectively corresponding to each of the user interfaces. Similarly, the item icon bar display module 940 is used to display an item icon bar on the touch screen 910 and the item icon bar comprises the item icons respectively corresponding to a plurality of items in the user interface.

Through the operations of the above three modules, the operating apparatus 900 may display three items, i.e. the user interface, the representational icon bar, and the item icon bar, on the touch screen 910. At this time, the switch module 950 further switches the user interface and the item displayed on the touch screen 910 according to the touch signal detected by the touch screen 910 and moves the representational icon bar and the item icon bar to corresponding positions.

When the touch signal is moved toward the first direction, the switch module 950 switches the user interface displayed by the user interface display module 920 accordingly and relatively moves the representational icon bar displayed by the representational icon bar display module 930. The switch module 950 further determines whether the displacement of the touch signal exceeds a preset value, and switches the user interface and moves the representational icon bar when the displacement exceeds the preset value. The displacement comprises a horizontal displacement or a vertical displacement.

On the other hand, when the touch signal is moved toward a second direction, the switch module 950 switches the item in the user interface displayed by the user interface display module 920 and relatively moves the item icon bar displayed by the item icon bar display module 940. The switch module 950 further determines whether the displacement of the touch signal exceeds a preset value, and switches the item in the user interface and moves the item icon bar only when the displacement exceeds the preset value.

It should be noted that when the touch screen 910 detects the touch signal, the representational icon bar display module 930 and the item icon bar display module 940 further include displaying a magnified representational icon or item icon depending on the currently displayed user interface or item so as to remind the user of the representational icon or item icon currently clicked. In addition, the representational icon bar and the item icon is determined to move toward a direction same as or opposite to the movement of the touch signal.

In addition, the present application further provides a recording medium such as an optical disk, a magnetic disk, and a removable hard disk, which records computer-readable authority sign-off program to perform the above method for operating a user interface. Here, the authority sign-off program recorded on the recording medium is basically comprised of a plurality of program code segments, such as the program code segments for establishing an organization chart, the program code segments for form sign-off, the program code segments for setting, and the program code segments for deployment, and the functions of such program code segments correspond to the steps of the above operating method and the functional block diagram of the above operating apparatus.

In summary, in the method and apparatus for operating a user interface and recording medium using the same according to the present application, it is determined whether to switch the user interface or the item therein through touching actions in different directions, and the representational icon bar and the item icon bar are arranged on different margins of the user interface so as to provide a more intuitive and convenient manner for the user to operate the user interface.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. A method for operating among a plurality of user interfaces comprising a first user interface and a second user interface wherein the first user interface comprises an email function and the second user interface comprises a contact function, adapted for a portable electronic device with a touch screen, and the method comprising:

displaying the first user interface on the touch screen and displaying a first email item and a content of the first email item in the first user interface;

detecting a first touch signal by the touch screen, wherein the first touch signal is a touch and slide motion signal or a touch and drag motion signal on the touch screen along a first direction;

switching the first user interface directly to the second user interface and displaying a first contact item comprising contact information in the second user interface in response to the first touch signal detected by the touch screen, wherein the contact information comprises a name and an image of the contact;

detecting a second touch signal by the touch screen, wherein the second touch signal is a touch and slide motion signal or a touch and drag motion signal on the touch screen along a second direction, wherein the first direction and the second direction are substantially perpendicular to each other;

switching from the first contact item to display a second contact item comprising contact information in the second user interface in response to the second touch signal detected by the touch screen;

detecting a third touch signal by the touch screen, wherein the third touch signal is a touch and slide motion signal or a touch and drag motion signal on the touch display along a third direction which is substantially opposite to the first direction; and switching the second user interface directly to the first user interface in response to the third touch screen detected by the touch screen;

displaying a representational icon bar on a first margin of the touch screen, wherein the representational icon bar comprises a plurality of representational icons respectively corresponding to each of the user interfaces; and displaying an item icon bar on a second margin of the touch screen, wherein the item icon bar comprises a plurality of item icons respectively corresponding to each of the items in the currently displayed user interface.

2. The method according to claim 1 further comprising:
moving the representational icon bar toward the first direction when the touch signal is moved toward the first direction.

3. The method according to claim 1 further comprising:
moving the representational icon bar toward a direction substantially opposite to the first direction when the touch signal is moved toward the first direction.

4. The method according to claim 1, further comprising:
moving the item icon bar toward the second direction when the touch signal is moved toward the second direction.

5. The method according to claim 1, wherein the process of displaying the representational icon bar on the first margin of the touch screen comprises:
displaying a magnified representational icon corresponding to the currently displayed user interface in the representational icon bar.

6. The method according to claim 1, wherein the process of displaying the item icon bar on the second margin of the user interface comprises:
displaying a magnified item icon corresponding to the currently displayed item in the currently displayed user interface in the item icon bar.

7. The method according to claim 1, wherein
the first direction is left or right; and
the second direction is up or down.

8. The method according to claim 1, wherein the process of detecting the touch signal by the touch screen further comprises:
determining whether a displacement of the touch signal exceeds a preset value; and
switching to the first or the second user interface or to the first or the second item when the displacement exceeds the preset value.

9. An apparatus for operating a user interface, comprising:
a touch screen, adapted to detect a touch signal;
a user interface display module, adapted to display one of a plurality of user interfaces on the touch screen, wherein the plurality of user interfaces comprises a first user interface and a second user interface wherein the first user interface comprises an email function and the second user interface comprises a contact function;
a switch module, adapted to directly switch between the first and the second user interface according to the first touch signal detected by the touch screen and to directly switch between email items displayed in the first user interface or contact items comprising contact information displayed in the second user interface according to the second touch signal detected by the touch screen, wherein a content of an email item is displayed on the touch screen in the first user interface, wherein
when the touch screen detects the first touch signal which is a touch and slide motion signal or a touch and drag motion signal on the touch screen along a first direction, the switch module switches the first user interface directly to the second user interface and displays a first contact item comprising contact information in the second user interface in response to the first touch signal detected by the touch screen, wherein the contact information comprises a name and a image of the contact, when the touch screen detects the second touch signal which is a touch and slide motion signal or a touch and drag motion signal on the touch screen along a second direction which is substantially perpendicular to the first direction, the switching module switches from the first contact item to display a second contact item comprising contact information in the second user interface in response to the second touch signal detected by the touch screen, and when the touch screen detects a third touch signal which is a touch and slide motion signal or a touch and drag motion signal on the touch display along a third direction which is substantially opposite to the first direction, the switch module switches the second user interface directly to the first user interface; and
a representational icon bar display module, adapted to display:
a representational icon bar on a first margin of the touch screen, wherein the representational icon bar comprises a plurality of representational icons respectively corresponding to each of the user interfaces; and
an item icon bar on a second margin of the touch screen, wherein the item icon bar comprises a plurality of item icons respectively corresponding to each of the items in the user interface.

10. The apparatus according to claim 9, wherein the switch module further comprising:
moving the representational icon bar toward a direction substantially opposite to the first direction when the touch signal is moved toward the first direction.

11. The apparatus according to claim 9, wherein the representational icon bar is displayed in the first direction and the item icon bar is displayed in the second direction.

12. The apparatus according to claim 9, wherein the representational icon bar display module further comprises displaying a magnified representational icon corresponding to the currently displayed user interface in the representational icon bar.

13. The apparatus according to claim 9, wherein the item icon bar display module further comprises displaying a magnified item icon corresponding to the currently displayed item in the currently displayed user interface in the item icon bar.

14. A non-transitory recording medium for recording a computer program, the computer program comprising a plurality of program codes adapted to be loaded into a portable electronic device to enable the portable electronic device to perform a method of operating a user interface comprising the steps of:
displaying the first user interface on the touch screen and displaying a first email item and a content of the first email item in the first user interface;
detecting a first touch signal by the touch screen, wherein the first touch signal is a touch and slide motion signal or a touch and drag motion signal on the touch screen along a first direction;
switching the first user interface directly to the second user interface and displaying a first contact item comprising contact information in the second user interface in response to the first touch signal detected by the touch screen, wherein the contact information comprises a name and an image of the contact;
detecting a second touch signal by the touch screen, wherein the second touch signal is a touch and slide motion signal or a touch and drag motion signal on the touch screen along a second direction, wherein the first direction and the second direction are substantially perpendicular to each other;

switching from the first contact item to display a second contact item comprising contact information in the second user interface in response to the second touch signal detected by the touch screen;

detecting a third touch signal by the touch screen, wherein the third touch signal is a touch and slide motion signal or a touch and drag motion signal on the touch display along a third direction which is substantially opposite to the first direction; and switching the second user interface directly to the first user interface in response to the third touch screen detected by the touch screen;

displaying a representational icon bar on a first margin of the touch screen, wherein the representational icon bar comprises a plurality of representational icons respectively corresponding to each of the user interfaces; and displaying an item icon bar on a second margin of the touch screen, wherein the item icon bar comprises a plurality of item icons respectively corresponding to each of the items in the currently displayed user interface.

* * * * *